United States Patent [19]

Schreiner et al.

[11] 4,418,015
[45] Nov. 29, 1983

[54] PHTHALOCYANINE REACTIVE DYESTUFFS

[75] Inventors: Kurt Schreiner, Hoenebach; Horst Jäger, Leverkusen, both of Fed. Rep. of Germany

[73] Assignee: Bayer Aktiengesellschaft, Leverkusen, Fed. Rep. of Germany

[21] Appl. No.: 322,354

[22] Filed: Nov. 17, 1981

[30] Foreign Application Priority Data

Nov. 28, 1980 [DE] Fed. Rep. of Germany ....... 3044798

[51] Int. Cl.$^3$ ..................... C09B 47/30; C09B 47/04
[52] U.S. Cl. .............................. 260/242.2; 260/245.1; 260/245.73; 260/245.76
[58] Field of Search ............. 260/242.2, 245.1, 245.73, 260/245.76

[56] References Cited

U.S. PATENT DOCUMENTS 3,210,345 10/1965 Gamlen et al. ............. 260/242.2 X
3,679,675 7/1972 von Tobel ................. 260/245.78 X
4,280,956 7/1981 Schreiner et al. ................ 260/242.2

FOREIGN PATENT DOCUMENTS 948256 1/1964 United Kingdom .
1296345 11/1972 United Kingdom .
1306738 2/1973 United Kingdom .

Primary Examiner—Richard Raymond

Attorney, Agent, or Firm—Sprung, Horn, Kramer & Woods

[57] ABSTRACT

The present invention relates to new phthalocyanine reactive dyestuffs which, in the form of the free acid, correspond to the formula I

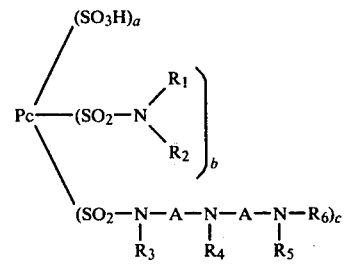

wherein
Pc, $R_1$, $R_2$, $R_3$, $R_4$, $R_5$, $R_6$, a, b and c have the meaning given in the text of the Application.

The phthalocyanine radical Pc can be metal-free, but preferably contains a metal.

The invention furthermore relates to processes for the preparation of the dyestuffs of the formula I and to the use of these compounds for dyeing or printing materials containing hydroxyl groups and/or nitrogen.

4 Claims, No Drawings

PHTHALOCYANINE REACTIVE DYESTUFFS

The present invention relates to new phthalocyanine reactive dyestuffs which, in the form of the free acid, correspond to the formula I

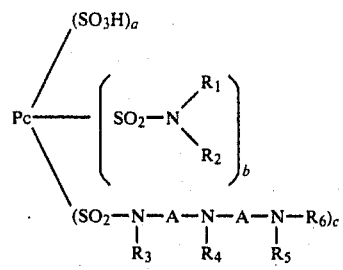

wherein
Pc is the radical of a phthalocyanine,
$R_1$ and $R_2$ can be identical or different and can represent hydrogen, optionally substituted alkyl, optionally substituted cycloalkyl, optionally substituted aralkyl or optionally substituted aryl,
or wherein
$R_1$ and $R_2$, together with the nitrogen atom between them, form a heterocyclic radical which optionally contains further hetero-atoms and/or is optionally substituted,
and wherein
a is a number from 0 to 3,
b is a number from 0 to 3 and
c is a number from 1 to 4,
wherein $(a+b+c) \leq 4$, and wherein
the radicals A can be identical or different and represent optionally substituted straight-chain alkylene with at least 2 C atoms, optionally substituted branched alkylene with at least 3 C atoms or optionally substituted cycloalkylene with at least 5 C atoms,
$R_3$ is hydrogen, optionally substituted alkyl or optionally substituted aralkyl,
$R_4$ is a radical of the formula $$-\overset{O}{\underset{\|}{C}}-R_7$$

wherein
$R_7$ represents optionally substituted alkyl, cycloalkyl, aralkyl, aryl or hetero-aryl,
and wherein
$R_5 = Z$,
wherein
Z represents the radical of a reactive group, and wherein
$R_6$ is hydrogen, optionally substituted alkyl or optionally substituted aralkyl.

The phthalocyanine radical can be metal-free, but preferably contains a metal. Possible metals are cobalt, nickel and copper.

Each sulphonic acid group and sulphonamide group in the dyestuffs of the formula (I) is bonded, in the 3- or 4-position, to a different benzene ring in the phthalocyanine.

The substituents $R_1$ to $R_7$ given in the present Application text are defined as follows:

Optionally substituted alkyl $R_1$ and $R_2$ is preferably $C_1$-$C_6$-alkyl which is optionally substituted by OH, COOH or $SO_3H$, for example methyl, ethyl, propyl, butyl, amyl, β-hydroxyethyl, γ-hydroxypropyl, pentahydroxyhexyl, carboxymethyl, β-carboxyethyl, β-sulphoethyl or β-sulphatoethyl.

Optionally substituted cycloalkyl $R_1$ or $R_2$ is preferably $C_3$-$C_7$-cycloalkyl which is optionally substituted by OH, COOH or $SO_3H$, for example cyclohexyl, 2-hydroxycyclohexyl or 4-sulphocyclohexyl.

Optionally substituted aralkyl $R_1$ or $R_2$ is preferably aralkyl which is optionally substituted by OH, COOH or $SO_3H$ in the aryl part and preferably contains 6 or 10 carbon atoms in the aryl part and 1 to 6 carbon atoms in the alkyl part, for example benzyl, phenethyl, carboxybenzyl or sulphobenzyl.

Optionally substituted aryl $R_1$ or $R_2$ is preferably phenyl or naphthyl which is optionally substituted by OH, COOH, $SO_3H$ or halogen (in particular chlorine), for example phenyl, naphthyl, chlorophenyl, methoxyphenyl, sulphophenyl or carboxyphenyl.

If $R_1$ and $R_2$, together with the nitrogen atom between them form a heterocyclic radical which optionally contains further hetero-atoms and/or is optionally substituted, the following groupings are preferred:

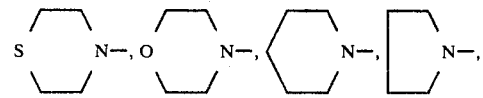

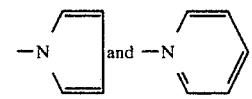

Optionally substituted straight-chain alkylene A with at least 2 C atoms is preferably straight-chain $C_2$-$C_{10}$-alkylene which is optionally substituted by OH, $SO_3H$ or COOH.

Optionally substituted branched alkylene A is preferably branched $C_3$-$C_{10}$-alkylene which is optionally substituted by OH, $SO_3H$ or COOH.

Optionally substituted cycloalkylene A with at least 5 C atoms is preferably $C_5$-$C_7$-alkylene which is optionally substituted by OH, $SO_3H$ or COOH. Examples of alkylene radicals A are: $-(CH_2)_i-$ (where i=2-8),

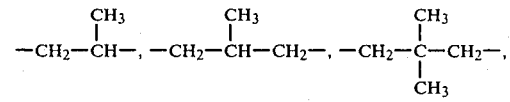

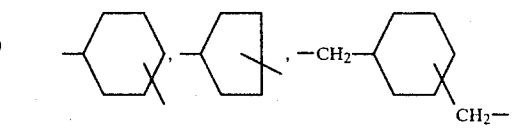

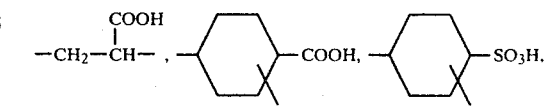

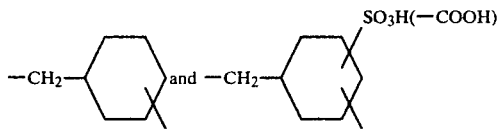

Optionally substituted alkyl $R_3$ or $R_6$ is preferably $C_1-C_8$-alkyl which is optionally substituted by COOH, $SO_3H$ or OH, for example β-carboxyethyl, β-sulphoethyl, β-sulphobutyl, γ-sulphobutyl, methyl, ethyl, propyl, isopropyl, butyl, carboxymethyl, α-carboxyethyl, α-carboxypropyl, α-carboxybutyl or sulphomethyl.

Optionally substituted aralkyl $R_3$ or $R_6$ is preferably phenyl-$C_1-C_4$-alkyl or naphthyl-$C_1-C_4$-alkyl which is optionally substituted by OH, $SO_3H$ or COOH, for example benzyl, phenethyl, naphthylmethyl, naphthylethyl, carboxybenzyl or sulphobenzyl.

Optionally substituted alkyl $R_7$ is preferably $C_1-C_{12}$-alkyl which is optionally substituted by OH, $SO_3H$, COOH, halogen, $C_1-C_4$-alkoxy or phenoxy, for example methyl, ethyl, n-propyl, sec.-propyl, n-butyl, sec.-butyl, tert.-butyl, neopentyl, n-hexyl, n-octyl, n-decyl, mono-, di- or tri-chloromethyl, β-chloroethyl, carboxamidomethyl, β-hydroxyethyl, β-methoxy-, -ethoxy- or -phenoxy-ethyl, 2-hydroxyprop-2-yl, 3-methoxypropyl, 3-chloropropyl, β-carboxyethyl, 3-carboxypropyl or 4-sulpho- or -sulphatobutyl.

Optionally substituted cycloalkyl $R_7$ is preferably $C_3-C_7$-cycloalkyl which is optionally substituted by OH, COOH or $SO_3H$, for example cyclohexyl, cyclopentyl or 2-tetrahydrofuryl.

Optionally substituted aralkyl $R_7$ is preferably benzyl, naphthylmethyl or phenethyl which is optionally substituted by OH, $CO_3H$ COOH, halogen, $NO_2$, $C_1-C_4$-alkyl or $C_1-C_4$-alkoxy, for example benzyl, naphthylmethyl, β-phenethyl or sulpho-, carboxy-, chloro-, methoxy-, nitro- or methyl-benzyl.

Optionally substituted aryl $R_7$ is preferably phenyl or naphthyl which is optionally substituted by OH, $SO_3H$, COOH, $C_1-C_4$-alkoxy, halogen, $NO_2$, $C_1-C_4$-acyl or $C_1-C_4$-alkyl, for example phenyl, 1- or 2-naphthyl, sulpho-, carboxy-, methoxy-, chloro-, nitro- or acetyl-phenyl, 2-, 3- or 4-tolyl or 2,4- or 2,5-dimethoxyphenyl.

Optionally substituted hetero-aryl $R_7$ is preferably hetero-aryl which is optionally substituted by OH, $SO_3H$, COOH, halogen or $C_1-C_4$-alkyl, for example 2-, 3- or 4-pyridyl or 2-imidazolyl.

By reactive groups Z there are to be understood radicals which contain one or more reactive groups or substituents which can be split off and which, when the dyestuffs are applied to cellulose materials in the presence of acid-binding agents and if appropriate under the influence of heat, are capable of reacting with the hydroxyl groups of the cellulose, or, when the dyestuffs are applied to high molecular weight polyamide fibres, such as wool, are capable of reacting with the NH groups of these fibres, covalent bonds being formed in both cases. A large number of such fibre-reactive groupings is known from the literature.

Reactive groups which are suitable according to the invention and which contain at least one substituent which can be split off and is bonded to a heterocyclic or aliphatic radical are, inter alia, those which contain at least one reactive substituent bonded to a 5-membered or 6-membered heterocyclic ring, such as to a monazine, diazine or triazine ring, for example a pyridine, pyrimidine, pyridazine, pyrazine, thiazine, oxazine or asymmetric or symmetric triazine ring, or to a ring system of this type which contains one or more fused-on aromatic rings, which as a quinoline, phthalazine, cinnoline, quinazoline, quinoxaline, acridine, phenazine or phenanthridine ring system. Preferred 5-membered or 6-membered heterocyclic rings containing at least one reactive substituent are accordingly those which contain one or more nitrogen atoms, and can contain fused-on-5-membered or, preferably, 6-membered carbocyclic rings.

Examples which may be mentioned of reactive substituents on the heterocyclic ring are: halogen (Cl, Br or F), ammonium, including hydrazinium, sulphonium, sulphonyl, azido ($N_3$), thiocyanato, thio, thioethers, oxyethers, sulphinic acid and sulphonic acid. Specific examples which may be mentioned are: symmetric mono- or di-halogeno-triazinyl radicals, for example 2,4-dichlorotriazin-6-yl, 2-amino-4-chlorotriazin-6-yl, 2-alkylamino-4-chlorotriazin-6-yl, such as 2-methylamino-4-chlorotriazin-6-yl, 2-ethylamino- or 2-propylamino-4-chlorotriazin-6-yl, 2-β-hydroxyethylamino-4-chlorotriazin-6-yl, 2-di-β-hydroxyethylamino-4-chlorotriazin-6-yl and the corresponding sulphuric acid half-esters, 2-diethylamino-4-chlorotriazin-6-yl, 2-morpholino- or 2-piperidino-4-chlorotriazin-6-yl, 2-cyclohexylamino-4-chlorotriazin-6-yl, 2-arylamino- and -substituted arylamino-4-chlorotriazin-6-yl, such as 2-phenylamino-4-chlorotriazin-6-yl or 2-(o-, m- or p-carboxy- or sulpho-phenyl)amino-4-chlorotriazin-6-yl, 2-alkoxy-4-chlorotriazin-6-yl, such as 2-methoxy- or ethoxy-4-chlorotriazin-6-yl, 2-(phenylsulphonylmethoxy)-4-chlorotriazin-6-yl, 2-aryloxy- or -substituted aryloxy-4-chlorotriazin-6-yl, such as 2-phenoxy-4-chlorotriazin-6-yl, 2-(p-sulphophenyl)-oxy-4-chlorotriazin-6-yl or 2-(o-, m- or p-methyl- or -methoxyphenyl)-oxy-4-chlorotriazin-6-yl, 2-alkylmercapto-, 2-arylmercapto- or 2-(substitued aryl)-mercapto-4-chlorotriazin-6-yl, such as 2-β-hydroxyethyl-mercapto-4-chlorotriazin-6-yl, 2-phenylmercapto-4-chlorotriazin-6-yl, 2-(4'-methylphenyl)-mercapto-4-chlorotriazin-6-yl or 2-(2',4'-dinitro)-phenylmercapto-4-chlorotriazin-6-yl, 2-methyl-4-chlorotriazin-6-yl, 2-phenyl-4-chlorotriazin-6-yl, 2,4-difluorotriazin-6-yl, 2-amino-4-fluorotriazin-6-yl, 2-alkylamino-4-fluorotriazin-6-yl, such as 2-methylamino-4-fluorotriazin-6-yl, 2-ethylamino- or 2-propylamino-4-fluorotriazin-6-yl, 2-β-hydroxyethylamino-4-fluorotriazin-6-yl, 2-di-β-hydroxyethylamino-4-fluorotriazin-6-yl and the corresponding sulphuric acid halfesters, 2-diethylamino-4-fluorotriazin-6-yl, 2-morpholino- or 2-piperidino-4-fluorotriazin-6-yl, 2-cyclohexylamino-4-fluorotriazin-6-yl, 2-arylamino- and -substituted arylamino-4-fluorotriazin-6-yl, such as 2-phenylamino-4-fluorotriazin-6-yl or 2-(o-, m- or p-carboxy- or sulphophenyl)amino-4-fluorotriazin-6-yl, 2-alkoxy-4-fluorotriazin-6-yl, such as 2-methoxy- or -ethoxy-4-fluorotriazin-6-yl, 2-(phenylsulphonylmethoxy)-4-fluorotriazin-6-yl, 2-aryloxy- or -substituted aryloxy-4-fluorotriazin-6-yl, such as 2-phenoxy-4-fluorotriazin-6-yl, 2-(p-sulphophenyl)-oxy-4-fluorotriazin-6-yl or 2-(o-, m- or p-methyl- or -methoxyphenyl)-oxy-4-fluorotriazin-6-yi, 2-alkylmercapto-, 2-arylmercapto- or 2-(substituted aryl)-mercapto-4-fluorotriazin-6-yl, such as 2-β-hydroxyethylmercapto-4-fluorotriazin-6-yl, 2-phenylmercapto-4-fluorotriazin-6-yl, 2-(4'-methylphenyl)-mercapto-4-fluorotriazin-6-yl or 2-(2',4'-dinitro)-phenylmercapto-4-fluorotriazin-6-yl 2-methyl-4-fluorotriazin-6-yl or 2-phenyl-4-fluorotriazin-6-yl, or mono-, di- or tri-halogenopyrimidinyl radicals, such as 2,4-dichloropyrimidin-6-yl, 2,4,5-trichloropyrimidin-6-yl, 2,4-dichloro-5-nitro-, 5-methyl-,-5-carboxymethyl-,-5-carboxy-, -5-cyano-, -5-vinyl-, -5-sulpho-, -5-mono-, -di- or -tri-chloromethyl- or -5-carbalkoxy-pyrimidin-6-yl, 2,6-dichloropyrimidine-4-carbonyl, 2,4-dichloropyrimidine-5-carbonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulphonyl, 2-chloroquinoxaline-3-carbonyl, 2- or 3-monochloroquinoxaline-6-cabonyl, 2- or 3-monochloroquinoxaline-6-sulphonyl, 2,3-dichloroquinoxaline-6-carbonyl, 2,3-dichloroquinoxaline-6-sulphonyl, 1,4-dichlorophthalazine-6-sulphonyl or -6-carbonyl, 2,4-dichloroquinazoline-7- or -6-sulphonyl or -carbonyl, 2-, 3- or 4-(4',5'-dichloropyridaz-6'-on-1'-yl)-phenyl-sulphonyl or -carbonyl, β-(4',5'-dichloropyridaz-6'-on-1'-yl)-ethylcarbonyl, N-methyl-N-(2,4-dichlorotriazin-6-yl)-carbamyl, N-methyl-N-(2-methylamino-4-chlorotriazin-6-yl)-carbamyl, N-methyl-N-(2-dimethylamino-4-chlorotriazin-6-yl)-carbamyl, N-methyl- or N-ethyl-N-(2,4-dichlorotriazin-6-yl)-aminoacetyl, N-methyl-N-(2,3-dichloroquinoxaline-6-sulphonyl)-aminoacetyl, N-methyl-N-(2,3-dichloroquinoxaline-6-carbonyl)-aminoacetyl, and the corresponding bromine and fluorine derivatives of the abovementioned chlorine-substituted heterocyclic radicals, amongst these, for example, 2-fluoropyrimidin-4-yl, 2,6-difluoropyrimidin-4-yl, 2,6-difluoro-5-chloropyrimidin-4-yl, 2-fluoro-5,6-dichloropyrimidin-4-yl, 2,6-difluoro-4-methylpyrimidin-4-yl, 2,5-difluoro-6-methylpyrimidin-4-yl, 2-fluoro-5-methyl-6-chloropyrimidin-4-yl, 2-fluoro-5-nitro-6-chloropyrimidin-4-yl, 5-bromo-2-fluoropyrimidin-4-yl, 2-fluoro-5-cyanopyrimidin-4-yl, 2-fluoro-5-methylpyrimidin-4-yl, 2,5,6-trifluoropyrimidin-4-yl, 5-chloro-6-chloromethyl-2-fluoropyrimidin-4-yl, 2,6-difluoro-5-bromopyrimidin-4-yl, 2-fluoro-5-bromo-6-methylpyrimidin-4-yl, 2-fluoro-5-bromo-6-chloromethylpyrimidin-4-yl, 2,6-difluoro-5-chloromethylpyrimidin-4-yl, 2,6-difluoro-5-nitropyrimidin-4-yl, 2-fluoro-6-methylpyrimidin-4-yl, 2-fluoro-5-chloro-6-methylpyrimidin-4-yl, 2-fluoro-5-chloropyrimidin-4-yl, 2-fluoro-6-chloropyrimidin-4-yl, 6-trifluoromethyl-5-chloro-2-fluoropyrimidin-4-yl, 6-trifluoromethyl-2-fluoropyrimidin-4-yl, 2-fluoro-5-nitropyrimidin-4-yl, 2-fluoro-5-trifluoromethylpyrimidin-4-yl, 2-fluoro-5-phenyl- or -5-methyl-sulphonylpyrimidin-4-yl, 2-fluoro-5-carboxamidopyrimidin-4-yl, 2-fluoro-5-carbomethoxypyrimidin-4-yl, 2-fluoro-5-bromo-6-trifluoromethylpyrimidin-4-yl, 2-fluoro-6-carboxamidopyrimidin-4-yl, 2-fluoro-6-carbomethoxypyrimidin-4-yl, 2-fluoro-6-phenylpyrimidin-4-yl, 2-fluoro-6-cyanopyrimidin-4-yl, 2,6-difluoro-5-methylsulphonylpyrimidin-4-yl, 2-fluoro-5-sulphonamidopyrimidin-4-yl, 2-fluoro-5-chloro-6-carbomethyloxypyrimidin-4-yl and 2,6-difluoro-5-trifluoromethylpyrimidin-4-yl; triazine radicals containing sulphonyl groups, such as 2,4-bis-(phenylsulphonyl)-triazin-6-yl, 2-(3'-carboxyphenyl)-sulphonyl-4-chlorotriazin-6-yl, 2-(3'-sulphophenyl)-sulphonyl-4-chlorotriazin-6-yl and 2,4-bis-(3'-carboxyphenylsulphonyl)-triazin-6-yl; pyrimidine rings containing sulphonyl groups, such as 2-carboxymethylsulphonylpyrimidin-4-yl, 2-methylsulphonyl-6-methylpyrimidin-4-yl, 2-methylsulphonyl-6-ethylpyrimidin-4-yl, 3-phenylsulphonyl-5-chloro-6-methylpyrimidin-4-yl, 2,6-bis-methylsulphonylpyrimidin-4-yl, 2,6-bis-methylsulphonyl-5-chloropyrimidin-4-yl, 2,4-bis-methyl-sulphonyl-pyrimidine-5-sulphonyl, 2-methylsulphonylpyrimidin-4-yl, 2-phenylsulphonylpyrimidin-4-yl, 2-trichloro-methylsulphonyl-6-methylpyrimidin-4-yl, 2-methylsulphonyl-5-chloro-6-methylpyrimidin-4-yl, 2-methylsulphonyl-5-bromo-6-methylpyrimidin-4-yl, 2-methylsulphonyl-5-chloro-6-ethylpyrimidin-4-yl, 2-methylsulphonyl-5-chloro-6-chloromethylpyrimidin-4-yl, 2-methylsulphonyl-4-chloro-6-methyl-pyrimidine-5-sulphonyl, 2-methylsulphonyl-5-nitro-6-methylpyrimidin-4-yl, 2,5,6-trimethylsulphonylpyrimidin-4-yl, 2-methylsulphonyl-5,6-dimethylpyrimidin-4-yl, 2-ethylsulphonyl-5-chloro-6-methylpyrimidin-4yl, 2-methylsulphonyl-6-chloropyrimidin-4-yl, 2,6-dimethylsulphonyl-5-chloropyrimidin-4-yl, 2-methylsulphonyl-6-carboxypyrimidin-4-yl, 2-methylsulphonyl-5-sulphopyrimidin-4-yl, 2-methylsulphonyl-6-carbomethoxypyrimidin-4-yl, 2-methylsulphonyl-5-carboxypyrimidin-4-yl, 2-methylsulphonyl-5-cyano-6-methoxypyrimidin-4-yl, 2-methylsulphonyl-5-chloropyrimidin-4-yl, 2-sulphoethylsulphonyl-6-methylpyrimidin-4-yl, 2-methylsulphonyl-5-bromopyrimidin-4-yl, 2-phenylsulphonyl-5-chloropyrimidin-4-yl, 2-carboxymethylsulphonyl-5-chloro-6-methylpyrimidin-4-yl, 2-methylsulphonyl-6-chloropyrimidine-4- and -5-carbonyl, 2,6-bis-(methylsulphonyl)-pyrimidine-4- or -5-carbonyl, 2-ethylsulphonyl-6-chloropyrimidine-5-carbonyl, 2,4-bis-(methylsulphonyl)-pyrimidine-5-sulphonyl and 2-methylsulphonyl-4-chloro-6-methylpyrimidine-5-sulphonyl or -carbonyl; triazine rings containing ammonium groups, such as 2-trimethylammonium-4-phenylamino- or -4-(o-, m-or p-sulphophenyl)-amino-triazin-6-yl, 2-(1,1-dimethylhydrazinium)-4-phenylamino- or -4-(o-, m- or p-sulphophenyl)-amino-triazin-6-yl, 2-(1,1-dimethylhydrazinium)-4-phenylamino- or -4-(o-, m- or p-sulphophenyl)-aminotriazin-6-yl, 2-(2-isopropylidene-1,1-dimethyl)-hydrazinium-4-phenylamino- or -4-(o-, m- or p-sulphophenyl)-amino-triazin-6-yl and 2-N-aminopyrrolidinium- or 2-N-aminopiperidinium-4-phenylamino- or -4-(o-, m- or p-sulphophenyl)-amino-triazin-6-yl, and also 4-phenylamino or 4-(sulphophenylamino)-triazin-6-yl radicals which contain 1,4-bis-aza-bicyclo-[2,2,2]-octane or 1,2-bis-aza-bicyclo-[0,3,3]-octane, quaternary-bonded via a nitrogen bond in the 2-position, 2-pyridinium-4-phenylamino- or -4-(o-, m- or p-sulphophenyl)-amino-triazin-6-yl and corresponding 2-oniumtriazin-6-yl radicals which are substituted in the 4-position by alkylamino groups, such as methylamino, ethylamino or β-hydroxyethylamino groups, alkoxy groups, such as methoxy or ethoxy groups, or aryloxy groups, such as phenoxy or sulphophenoxy groups, 2-chlorobenzothiazole-5- or -6-carbonyl or -5- or -6-sulphonyl, 2-arylsulphonyl- or -alkylsulphonyl-benzothiazole-5- or -6-carbonyl or -5- or -6-sulphonyl, such as 2-methylsulphonyl- or 2-ethylsulphonyl-benzothiazole-5- or -6-sulphonyl or -carbonyl, 2-phenylsulphonyl-benzothiazole-5- or -6-sulphonyl or -carbonyl and the corresponding 2-sulphonylbenzothiazole-5- or -6-carbonyl or -sulphonyl derivatives which contain sulpho groups in the fused-on benzene ring, 2-chloro-benzoxazole-5- or -6-carbonyl or -sulphonyl, 2-chlorobenzimidazole-5- or -6-carbonyl or -sulphonyl, 2-chloro-1-methylbenzimidazole-5- or -6-carbonyl or -sulphonyl, 2-chloro-4-methyl-1,3-thiazole-5-carbonyl or -5-sulphonyl and the N-oxide of 4-chloro- or 4-nitro-quinoline-5-carbonyl.

Reactive groups of the aliphatic series may also be mentioned, such as acrylyl, mono-, di- or tri-chloroacrylyl, such as —CO—CH=CH—Cl, —CO—CCl=CH$_2$ and —CO—CCl=CCl$_2$, and also —CO—CCl=CH—COOH, —CO—CH=C-Cl—COOH, β-chloropropionyl, 3-phensulphonylpropionyl, 3-methylsulphonylpropionyl, β-sulphatoethylaminosulphonyl, vinylsulphonyl, βchloroethylsulphonyl, β-sulphatoethylsulphonyl, β-methylsulphonylethylsulphonyl, β-phenylsulphoethylsulphonyl, 2-fluoro-2-chloro-3,3-difluorocyclobutane-1-carbonyl, 2,2,3,3-tetrafluorocyclobutane-1-carbonyl or -1-sulphonyl, β-(2,2,3,3-tetrafluorocyclobut-1-yl)-acrylyl, α- or β-bromoacrylyl or an α- or β-alkyl- or -aryl-sulphonylacrylyl group, such as α- or β-methylsulphonylacrylyl.

Further suitable reactive groups which may be mentioned are those of the general formula

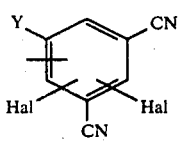

II wherein
the radicals Hal independently of one another each denote a halogen atom occupying the remaining 2-, 4- or 6-positions of the benzene nucleus and Y represents H or an electron-withdrawing substituent,
and wherein, in particular,
the radicals Hal in each case denote Cl or, in particular, F and
Y represents an electron-withdrawing substituent, in particular F, Cl or CN.

Corresponding reactive radicals of the above formula II are listed in German Offenlegungsschrift No. 2,916,715.

Reactive groups which are similarly suitable correspond to the general formula III

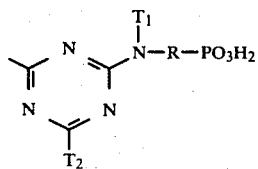

III wherein
T$_2$ represents F, Cl, Br, OH, a lower alkoxy radical with 1 to 4 C atoms, NH$_2$, a quaternary ammonium group or the radical of a primary or secondary amine, which, if it is aromatic, can be substituted, for example by SO$_3$H or COOH,
T$_1$ represents H or an alkyl or substituted alkyl radical with up to 4 carbon atoms and R represents a hydrocarbon or substituted hydrocarbon radical.

Examples of hydrocarbon and substituted hydrocarbon radicals R are saturated aliphatic radicals, such as, for example, alkylene radicals which have 1 to 6 carbon atoms and can be substituted, for example by OH, phenyl and benzyl; cycloaliphatic and aromatic radicals, such as, for example, cyclohexylene and phenylene, which can be substituted, for example by F, Cl, Br, alkyl, alkoxy, SO$_3$H, CO$_2$H, CF$_3$ and NO$_2$; naphthylene radicals, which can be substituted, for example by SO$_3$H and PO$_3$H$_2$; and araliphatic radicals, such as, for example, —C$_6$H$_4$.CH$_2$—.

Examples of alkyl and substituted alkyl radicals T$_1$ are: C$_1$-C$_4$-alkyl radicals, such as, for example, n-butyl, n-propyl, ethyl and methyl; hydroxyalkyl radicals, such as, for example, β-hydroxyethyl and β-hydroxypropyl; β-sulphatoethyl, —CH$_2$—CH$_2$—PO$_3$H$_2$ and β-cyanoethyl; and alkoxyalkyl radicals, such as, for example, β-methoxypropyl, β-ethoxyethyl and β-methoxyethyl.

Examples of amino radicals T$_2$ are methylamino, ethylamino, n-propylamino, dimethylamino, diethylamino, β-hydroxyethyl-amino, di-(β-hydroxyethyl)-amino, piperidino, morpholino, β-methoxyethylamino, carboxymethylamino, β-sulphoethylamino, N-methyl-β-sulphoethylamino, β-phosphono-ethylamino, o-, m- or p-sulphoanilino, N-methyl-o-, -m- or -p-sulphoanilino, 2,4-, 2,5- or 3,5-disulphoanilino, o-, m- or p-carboxyanilino, 5-sulpho-2-carboxyanilino, 4- or 5-sulpho-2-methyl-anilino, 4- or 5-sulpho-2-methoxyanilino, 4- or 5-sulpho-2-chloroanilino, 2-, 5- or 8-sulpho-1-naphthylamino, 1-, 4- or 3-sulpho-2-naphthylamino, 1,5- 4,8-, 5,7- or 6,8-disulpho-2-naphthylamino and 3,8- or 4,8-disulpho-1-naphthlamino.

Corresponding reactive radicals of the above formula III are listed, inter alia, in German Offenlegungsschrift No. 2,616,683.

Preferred dyestuffs correspond to the formula IV

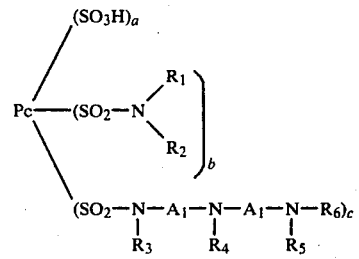

IV wherein
R$_1$, R$_2$, R$_3$, R$_4$, R$_5$, R$_6$, Pc, a, b and c have the abovementioned meaning and the radicals A$_1$ can be identical or different and represent —CH$_2$—CH$_2$-,

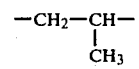

or —CH$_2$—CH$_2$—CH$_2$-.

Particularly preferred dyestuffs are those of the formula IVa

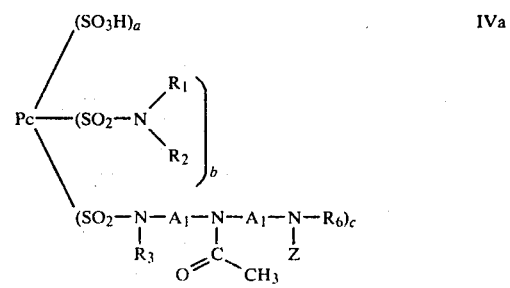

IVa wherein

Pc, $R_1$, $R_2$, $R_3$, $A_1$, Z, $R_6$, a, b and c have the abovementioned meaning.

Very particularly preferred dyestuffs are those of the formula V

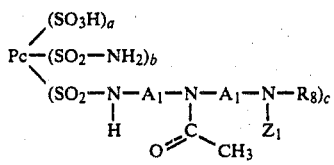

wherein
Pc, $A_1$, a, b and c have the abovementioned meaning,
$R_8$ represents hydrogen, carboxymethyl or carboxyethyl and
$Z_1$ denotes the radical of a mono- or di-halogenotriazine.

Examples of $Z_1$ (a mono- or di-halogenotriazine radical) are 2,4-dichloro-triazin-6-yl, 2-amino-4-chlorotriazin-6-yl, 2-alkylamino-4-chlorotriazin-6-yl, such as 2-methylamino-4-chlorotriazin-6-yl, 2-ethylamino- or 2-propylamino-4-chlorotriazin-6-yl, 2-β-hydroxyethylamino-4-chlorotriazin-6-yl, 2-di-β-hydroxyethylamino-4-chlorotriazin-6-yl and the corresponding sulphuric acid half-esters, 2-diethylamino-4-chlorotriazin-6-yl, 2-morpholino- or 2-piperidino-4-chlorotriazin-6-yl, 2-cyclohexylamino-4-chlorotriazin-6-yl, 2-arylamino- and -substituted arylamino-4-chlorotriazin-6-yl, such as 2-phenylamino-4-chlorotriazin-6-yl or 2-(o-m- or p-carboxy- or sulphophenyl)-amino-4-chlorotriazin-6-yl, 2-alkoxy-4-chlorotriazin-6-yl, such as 2-methoxy- or -ethoxy-4-chlorotriazin-6-yl, 2-(phenylsulphonylmethoxy)-4-chlorotriazin-6-yl, 2-aryloxy- or -substituted aryloxy-4-chlorotriazin-6-yl, such as 2-phenoxy-4-chlorotriazin-6-yl, 2-(p-sulphophenyl)-oxy-4-chlorotriazin-6-yl or 2-(o-, m- or p-methyl or methoxy-phenyl)-oxy-4-chlorotriazin-6-yl, 2-alkylmercapto-, 2-arylmercapto- or 2-(substituted aryl)-mercapto-4-chlorotriazin-6-yl, such as 2-β-hydroxyethylmercapto-4-chlorotriazin-6-yl, 2-phenylmercapto-4-chlorotriazin-6-yl, 2-(4'-methylphenyl)-mercapto-4-chlorotriazin-6-yl or 2-(2',4'-dinitro)-phenylmercapto-4-chlorotriazin-6-yl, 2-methyl-4-chlorotriazin-6-yl, 2-phenyl-4-chlorotriazin-6-yl, 2,4-difluorotriazin-6-yl, 2-amino-4-fluorotriazin-6-yl, 2-alkylamino-4-fluorotriazin-6-yl, such as 2-methylamino-4-fluorotriazin-6-yl, 2-ethylamino- or 2-propylamino-4-fluorotriazin-6-yl, 2-β-hydroxyethylamino-4-fluorotriazin-6-yl, 2-di-β-hydroxyethylamino-4-fluorotriazin-6-yl and the corresponding sulphuric acid half-esters, 2-diethylamino-4-fluorotriazin-6-yl, 2-morpholino- or 2-piperidino-4-fluorotriazin-6-yl, 2-cyclohexylamino-4-fluorotriazin-6-yl, 2-arylamino- and -substituted arylamino-4-fluorotriazin-6-yl, such as 2-phenylamino-4-fluorotriazin-6-yl or 2-(o-, m- or p-carboxy- or sulphophenyl)-amino-4-fluorotriazin-6-yl, 2-alkoxy-4-fluorotriazin-6-yl, such as 2-methoxy- or -ethoxy-4-fluorotriazin-6-yl, 2-(phenylsulphonylmethoxy)-4-fluorotriazin-6-yl, 2-aryloxy- or -substituted aryloxy-4-fluorotriazin-6-yl, such as 2-phenoxy-4-fluorotriazin-6-yl, 2-(p-sulphophenyl)-oxy-4-fluorotriazin-6-yl or 2-(o-, m- or p-methyl- or -methoxyphenyl)-oxy-4-fluorotriazin-6-yl, 2-alkylmercapto, 2-arylmercapto- or 2-(substituted aryl)-mercapto-4-fluorotriazin-6-yl, such as 2-β-hydroxyethyl-mercapto-4-fluorotriazin-6-yl, 2-phenylmercapto-4-fluorotriazin-6-yl, 2-(4'-methylphenyl)-mercapto-4-fluorotriazin-6-yl or 2-(2',4'-dinitro)phenylmercapto-4-fluorotriazin-6-yl, 2-methyl-4-fluorotriazin-6-yl and 2-phenyl-4-fluorotriazin-6-yl.

Compounds of the formula I are prepared, for example, by a process in which compounds of the formula VI

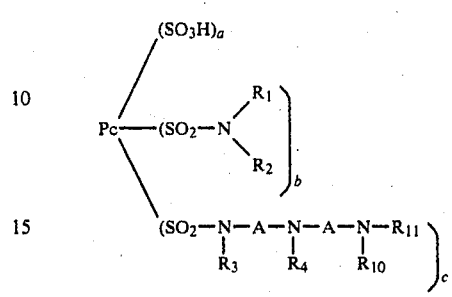

wherein
Pc, $R_1$, $R_2$, $R_3$, $R_4$, A, a, b and c have the abovementioned meaning and
$R_{10}$ and $R_{11}$ independently of one another are hydrogen or optionally substituted alkyl or aralkyl radicals, which are preferably substituted by groups which confer solubility in water (such as, for example, $SO_3H$ or COOH),
are acylated with c mols of an acylating agent of the formula VII $$L-Z \qquad \text{VII}$$

wherein
Z has the meaning given and
L represents a group which can be split off as an anion.

Reactive components of the formula VII which are suitable for this reaction are, for example, those on which the abovementioned reactive groups are based, that is to say, in general, the halides, in particular the chlorides, of the said acyl components Z. From the large number of compounds available, the following may be mentioned here as examples: symmetric trihalogeno-triazines, such as cyanuric chloride and cyanuric fluoride, symmetric dihalogeno-monoamino- and -mono-(substituted amino)-triazines, such as 2,6-dichloro-4-aminotriazine, 2,6-dichloro-4-methylaminotriazine, 2,6-dichloro-4-ethylaminotriazine, 2,6-dichloro-4-hydroxyethylaminotriazine, 2,6-dichloro-4-phenylamino-triazine, 2,6-dichloro-4-(o-, m- or p-sulphophenyl)-aminotriazine, 2,6-dichloro-4-(2',3'-, 2',4'-, 3',4'- or 3',5'-disulphophenyl)-aminotriazine, 2,6-dichloro-4-(2'-methyl-4'-sulphophenyl)-aminotriazine, 2,6-dichloro-(2'-chloro-4'-sulphophenyl)-aminotriazine, 2,6-dichloro-(2'-methyl-5'-sulphophenyl)-aminotriazine, 2,6-dichloro-(2'-methoxy-5'-sulphophenyl)-aminotriazine, 2,6-dichloro-(2',5'-disulpho-4'-methoxyphenyl)-aminotriazine and 2,6-dichloro-(4',8'-disulphonaphth-2'-yl)-aminotriazine, symmetric dichloroalkoxy- and -aryloxy-triazines, such as 2,6-dichloro-4-methoxytriazine, 2,6-dichloro-4-ethoxytriazine, 2,6-dichloro-4-phenoxytriazine and 2,6-dichloro-4-(o-, m- or p-sulphophenyl)-oxytriazine, symmetric dichloroalkylmercapto- and -arylmercapto-triazines, such as 2,6-dichloro-4-ethylmercapto-triazine, 2,6-dichloro-4-phenylmercapto-triazine, 2,6-dichloro-4-(p-methylphenyl)-mercaptotriazine and 2,6-dichloro-4-methoxyethoxytriazine, 2,6-difluoro-4-aminotriazine, 2,6- difluoro-4-methylaminotriazine, 2,6-difluoro-4-ethylaminotriazine, 2,6-difluoro-4-hydroxyethylaminotriazine, 2,6-difluoro-4-phenylaminotriazine, 2,6-difluoro-4-(o-, m- or p-sulphophenyl)-aminotriazine, 2,6-difluoro-4-(2',3'-, 2',4'-, 3',4'- or 3',5'-disulphophenyl)-aminotriazine, 2,6-difluoro-4-(2'-methyl-4'-sulphophenyl)-aminotriazine, 2,6-difluoro-(2'-chloro-4'-sulphophenyl)-aminotriazine, 2,6-difluoro-(2'-methyl-5'-sulphophenyl)-aminotriazine, 2,6-difluoro-(2'-methoxy-5'-sulphophenyl)-aminotriazine, 2,6-difluoro-(2',5'-sulpho-4'-methoxyphenyl)-aminotriazine and 2,6-difluoro-(4',8'-disulphonaphth-2'-yl)-aminotriazine, symmetric difluoro-alkoxy- and -aryloxy-triazines, such as 2,6-difluoro-4-methoxytriazine, 2,6-difluoro-4-ethoxytriazine, 2,6-difluoro-4-phenoxytriazine and 2,6-difluoro-4-(o-, m- or p-sulphophenyl)-oxytriazine, symmetric difluoro-alkylmercapto- and -arylmercapto-triazines, such as 2,6-difluoro-4-ethylmercapto-triazine, 2,6-difluoro-4-phenylmercapto-triazine, 2,6-difluoro-4-(p-methylphenyl)-mercaptotriazine and 2,6-difluoro-4-methoxyethoxytriazine; tetrahalogen-pyrimidines, such as tetrachloro-, tetrabromo- or tetrafluoro-pyrimidine, 2,4,6-trihalogenopyrimidines, such as 2,4,6-trichloro-, -tribromo- or trifluoro-pyrimidine, and dihalogenopyrimidines, such as 2,4-dichloro-, -dibromo- or -difluoro-pyrimidines; 2,4,6-trichloro-5-nitro-, -5-methyl-, -5-carbomethoxy-, -5-carbethoxy-, -5-carboxymethyl-, -5-mono-, -di-, -trichloromethyl-, -5-carboxy-, -5-sulpho-, -5-cyano-, -5-vinyl-pyrimidine, 2,4-difluoro-6-methylpyrimidine, 2,6-difluoro-4-methyl-5-chloropyrimidine, 2,4-difluoro-5-sulphonylethylpyrimidine, 2,6-difluoro-4-chloropyrimidine, 2,4,6-trifluoro-5-chloropyrimidine, 2,6-difluoro-4-methyl-5-bromopyrimidine, 2,4-difluoro-5,6-dichloro-or -dibromo-pyrimidine, 4,6-difluoro-2,5-dichloro- or -di-bromo-pyrimidine, 2,6-difluoro-4-bromopyrimidine, 2,4,6-trifluoro-5-bromopyrimidine, 2,4,6-trifluoro-5-chloromethylpyrimidine, 2,4,6-trifluoro-5-nitropyrimidine, 2,4,6-trifluoro-5-cyanopyrimidine, 2,4,6-trifluoropyrimidine-5-carboxylic acid alkyl esters or -5-carboxylic acid amides, 2,6-difluoro-5-methyl-4-chloropyrimidine, 2,6-difluoro-5-chloropyrimidine, 2,4,6-trifluoro-5-methylpyrimidine, 2,4,5-trifluoro-6-methylpyrimidine, 2,4-difluoro-5-nitro-6-chloropyrimidine, 2,4-difluoro-5-cyanopyrimidine, 2,4-difluoro-5-methylpyrimidine, 6 trifluoromethyl-5-chloro-2,4-difluoro-pyrimidine, 6-phenyl-2,4-difluoropyrimidine, 6-trifluoromethyl-2,4-difluoropyrimidine, 5-trifluoromethyl-2,4,6-trifluoropyrimidine, 2,5-difluoro-5-nitro-pyrimidine, 2,4-difluoro-5-trifluoromethylpyrimidine, 2,4-difluoro-5-methylsulphonyl-pyrimidine, 2,4-difluoro-5-phenyl-pyrimidine, 2,4-difluoro-5-carboxamido-pyrimidine, 2,4-difluoro-5-carbomethoxypyrimidine, 2,4-difluoro-6-trifluoromethylpyrimidine, 2,4-difluoro-5-bromo-6-trifluoromethyl-pyrimidine, 2,4-difluoro-6-carboxamido-pyrimidine, 2,4-difluoro-6-carbomethoxy-pyrimidine, 2,4-difluoro-6-phenyl-pyrimidine, 2,4-difluoro-6-cyanopyrimidine, 2,4,6-trifluoro-5-methyl-sulphonyl-pyrimidine, 2,4-difluoro-5-sulphonamido-pyrimidine, 2,4-difluoro-5-chloro-6-carbomethoxy-pyrimidine, 5-trifluoromethyl-2,4-difluoropyrimidine, 2,4-dichloropyrimidine-5-carboxylic acid chloride, 2,4,6-trichloropyrimidine-5-carboxylic acid chloride, 2-methyl-4-chloropyrimidine-5-carboxylic acid chloride, 2-chloro-4-methylpyrimidine-5-carboxylic acid chloride and 2,6-dichloropyrimidine-4-carboxylic acid chloride; reactive pyrimidine components with sulphonyl groups which can be split off, such as 2-carboxymethylsulphonyl-4-chloropyrimidine, 2-methylsulphonyl-4-chloro-6-methylpyrimidine, 2,4-bis-methylsulphonyl-6-methylpyrimidine, 2,4-bis-phenylsulphonyl-5-chloro-6-methylpyrimidine, 2,4,6-tris-methylsulphonylpyrimidine, 2,6-bis-methylsulphonyl-4,5-dichloropyridimine, 2,4-bis-methylsulphonylpyrimidine-5-sulphonic acid chloride, 2-methylsulphonyl-4-chloropyrimidine, 2-phenylsulphonyl-4-chloropyrimidine, 2,4-bis-trichloromethylsulphonyl-6-methylpyrimidine, 2,4-bis-methylsulphonyl-5-chloro-6-methylpyrimidine, 2,4-bis-methylsulphonyl-5-bromo-6-methylpyrimidine, 2-methylsulphonyl-4,5-dichloro-6-methylpyrimidine, 2-methylsulphonyl-4,5-dichloro-6-chloromethylpyrimidine, 2-methylsulphonyl-4-chloro-6-methylpyrimidine-5-sulphonic acid chloride, 2-methylsulphonyl-4-chloro-5-nitro-6-methylpyrimidine, 2,4,5,6-tetramethylsulphonyl-pyrimidine, 2-methylsulphonyl-4-chloro-5,6-dimethylpyrimidine, 2-ethylsulphonyl-4,5-dichloro-6-methylpyrimidine, 2-methylsulphonyl-4,6-dichloropyrimidine, 2,4,6-tris-methylsulphonyl-5-chloropyrimidine, 2-methylsulphonyl-4-chloro-6-carboxypyrimidine, 2-methylsulphonyl-4-chloropyrimidine-5-sulphonic acid, 2-methylsulphonyl-4-chloro-6-carbomethoxypyrimidine, 2-methylsulphonyl-4-chloro-pyrimidine-5-carboxylic acid, 2-methylsulphonyl-4-chloro-5-cyano-6-methoxypyrimidine, 2-methylsulphonyl-4,5-dichloropyrimidine, 4,6-bis-methylsulphonylpyrimidine, 4-methylsulphonyl-6-chloropyrimidine, 2-sulphoethylsulphonyl-4-chloro-6-methylpyrimidine, 2-methylsulphonyl-4-chloro-5-bromopyrimidine, 2-methylsulphonyl-4-chloro-5-bromo-6-methylpyrimidine, 2,4-bis-methylsulphonyl-5-chloropyrimidine, 2-phenylsulphonyl-4,5-dichloropyrimidine, 2-phenylsulphonyl-4,5-dichloro-6-methylpyrimidine, 2-carboxymethylsulphonyl-4,5-dichloro-6-methylpyrimidine, 2-(2'-, 3'- or 4'-carboxyphenylsulphonyl)-4,5-dichloro-6-methylpyrimidine, 2,4-bis-(2'-, 3'- or 4'-carboxyphenylsulphonyl)-5-chloro-6-methylpyrimidine, 2-methylsulphonyl-6-chloropyrimidine-4- or -5-carboxylic acid chloride, 2-ethylsulphonyl-6-chloropyrimidine-4- or -5-carboxylic acid chloride, 2,6-bis-(methylsulphonyl)-pyrimidine-4-carboxylic acid chloride, 2-methylsulphonyl-6-methyl-4-chloro- or -4-bromo-pyrimidine-5-carboxylic acid chloride or bromide and 2,6-bis-(methylsulphonyl)-4-chloropyrimidine-5-carboxylic acid chloride; examples of further reactive components of the heterocyclic series which have reactive sulphonyl substituents are 3,6-bis-phenylsulphonyl-pyridazine, 3-methylsulphonyl-6-chloropyridazine, 3,6-bis-trichloromethylsulphonylpyridazine, 3,6-bis-methylsulphonyl-4-methylpyridazine, 2,5,6-tris-methylsulphonylpyrazine, 2,4-bis-methylsulphonyl-1,3,5-triazine, 2,4-bis-methylsulphonyl-6-(3'-sulphophenylamino)-1,3,5-triazine, 2,4-bis-methylsulphonyl-6-N-methylanilino-1,3,5-triazine, 2,4-bis-methylsulphonyl-8-phenoxy-1,3,5-triazine, 2,4-bis-methylsulphonyl-6-trichloroethoxy-1,3,5-triazine, 2,4,6-tris-phenylsulphonyl-1,3,5-triazine, 2,4-bis-methylsulphonylquinazoline, 2,4-bis-trichloromethyl-sulphonylquinoline, 2,4-bis-carbonylmethylsulphonylquinoline, 2,6-bis-(methylsulphonyl)-pyridine-4-carboxylic acid chloride and 1-(4'-chlorocarbonylphenyl or 2'-chlorocarbonylethyl)-4,5-bis-methylsulphonyl-pyridaz-6-one; further heterocyclic reactive components containing mobile halogen are, inter alia, 2- or 3-monochloroquinoxaline-6-carboxylic acid chloride or -6-sulphonic acid chloride, 2- or 3-monobromoquinoxaline-6-carboxylic acid bromide or -6-sulphonic acid bromide, 2,3-dichloroquinoxaline-6-carboxylic acid chloride or -6-sulphonic acid chloride, 2,3-dibromoquinoxaline-6-carboxylic acid bromide or -6-sulphonic acid bromide, 1,4-dichlorophthalazine-6-carboxylic acid chloride or -6-sulphonic acid chloride and the corresponding bromine compounds, 2,4-dichloroquinazoline-6- or -7-carboxylic acid chloride or -7-sulphonic acid chloride and the corresponding bromine compounds, 2- or 3- or 4-(4',5'-dichloropyridaz-6'-on-1'-yl)-phenyl-sulphonic acid chloride or -carboxylic acid chloride and the corresponding bromine compounds, β-(4',5'-dichloropyridaz-6'-on-1'-yl)-ethylcarboxylic acid chloride, 2-chloroquinoxaline-3-carboxylic acid chloride and the corresponding bromine compounds, N-methyl-N-(2,4-dichlorotriazin-6-yl)-carbamic acid chloride, N-methyl-N-(2-chloro-4-methylamino-triazin-6-yl)-carbamic acid chloride, N-methyl-N-(2-chloro-4-dimethylamino-triazin-6-yl)-carbamic acid chloride, N-methyl- or N-ethyl-N-(2,4-dichlorotriazin-6-yl)-aminoacetyl chloride, N-methyl-, N-ethyl- or N-hydroxyethyl-N-(2,3-dichloroquinoxaline-6-sulphonyl- or -6-carbonyl)-aminoacetyl chloride and the corresponding bromine derivatives, and also 2-chlorobenzothiazole-5- or -6-carboxylic acid chloride or -5- or -6-sulphonic acid chloride and the corresponding bromine compounds, 2-aryl-sulphonyl-or 2-alkylsulphonyl-benzothiazole-5- or -6-carboxylic acid chloride or -5- or -6-sulphonic acid chloride, such as 2-methylsulphonyl-, 2-ethylsulphonyl- or 2-phenylsulphonyl-benzothiazole-5- or -6-sulphonic acid chloride or -5- or -6-carboxylic acid chloride and the corresponding 2-sulphonylbenzothiazole derivatives containing sulphonic acid groups in the fused-on benzene ring, 3,5-bis-methylsulphonyl-isothiazole-4-carboxylic acid chloride, 2-chloro-benzoxazole-5- or -6-carboxylic acid chloride or -sulphonic acid chloride and the corresponding bromine derivatives, 2-chlorobenzimidazole-5- or -6-carboxylic acid chloride or -sulphonic acid chloride and the corresponding bromine derivatives, 2-chloro-1-methylbenzimidazole-5- or -6-carboxylic acid chloride or -sulphonic acid chloride and the corresponding bromine derivatives, 2-chloro-4-methyl-1,3-thiazole-5-carboxylic acid chloride or -4- or -5-sulphonic acid chloride, and 2-chlorothiazole-4-or 5-sulphonic acid chloride and the corresponding bromine derivatives.

Examples of other reactive components which can be used for the preparation of the compounds according to the invention are those of the formula

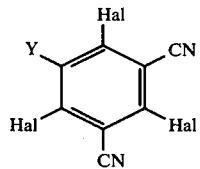

VII in which
the radicals Hal independently of one another each denote a halogen atom and
Y represents an electron-withdrawing substituent,
and wherein, in particular,
Hal represents chlorine or fluorine and
Y preferably represents fluorine, chlorine or CN, and statements regarding these components can be found in German Offenlegungsschrift 2,916,715.

Reactive components which are likewise suitable correspond to the formula

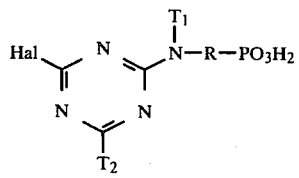

IX wherein
Hal represents F, Cl or Br and $T_1$, $T_2$ and R have the meaning given in the case of formula III.

Reactive components of this formula are described in German Offenlegungsschrift 2,616,683.

Examples which may be mentioned from the series of aliphatic reactive components are: acrylyl chloride, mono-, di- or tri-chloroacrylyl chloride, 3-chloropropionyl chloride, 3-phenylsulphonylpropionyl chloride, 3-methylsulphonyl-propionyl chloride, 3-ethyl-sulphonylpropionyl chloride, 2-chloroethanesulphonyl chloride, chloromethanesulphonyl chloride, 2-chloroacetyl chloride, 2,2,3,3-tetrafluorocyclobutane-1-carboxylic acid chloride, β-(2,2,3,3-tetrafluorocyclobut-1-yl)-acrylyl chloride, 2,2,3-trifluoro-2-chlorocyclobutane-1-carboxylic acid chloride, β-methylsulphonyl-acrylyl chloride, α-methylsulphonyl-acrylyl chloride, α-bromoacrylyl chloride and β-bromoacrylyl chloride.

Compounds of the formula I which carry a symmetric monohalogeno-triazine radical as the fibre-reactive radical Z can also be prepared by a process in which, in the corresponding dyestuffs which carry a symmetric dihalogeno-triazine radical instead of the symmetric monohalogeno-triazine radical, one halogen of the symmetric dihalogeno-triazine radical X is replaced by another substituent by condensation with a compound H-E (X) in a manner which is known per se.

E in formula X represents a substituent, in particular $OR_{17}$, $SR_{17}$ or $NR_{18}R_{19}$,
wherein
$R_{17}$ denotes an optionally substituted alkyl, aryl, or hetero-aryl radical,
$R_{18}$ represents hydrogen or an optionally substituted alkyl radical and
$R_{19}$ represents hydrogen or an optionally substituted alkyl, aryl or hetero-aryl radical, or
$R_{18}$ and $R_{19}$ form a ring, optionally with the inclusion of a hetero-atom.

Examples of optionally substituted alkyl radicals $R_{17}$ are: methyl, ethyl, propyl, isopropyl, t-butyl, methoxymethyl, methoxyethyl and ethoxyethyl. Examples of optionally substituted aryl radicals $R_{17}$ are: phenyl, 4-chlorophenyl and 4-methoxyphenyl. Suitable alkyl radicals $R_{18}$ are: methyl, ethyl, propyl, isopropyl, n-butyl, cyclohexyl, hydroxyethyl, methoxyethyl, carboxymethyl, β-carboxyethyl and β-sulphoethyl. Suitable alkyl radicals $R_{19}$ are: methyl, ethyl, propyl, isopropyl, hydroxyethyl and methoxyethyl. Suitable aryl radicals $R_{19}$ are phenyl, o-, m- or p-chlorophenyl, o-, m- or p-methoxyphenyl, o-, m-, p-methylphenyl, o-, m-, p-sulphophenyl, 2-methyl-4- or -5-sulphophenyl, 2-chloro-4- or -5-sulphophenyl, 2-methoxy-4- or -5-sulphophenyl, 2,5-disulphophenyl, 3,5-disulphophenyl, 2,5-disulpho-4-methoxyphenyl, 2-carboxyphenyl, 2-carboxy-4- or -5-sulphophenyl and 2-sulpho-4-methylphenyl. Suitable ring systems of the formula $—NR_{18}R_{19}$ are the radicals of pyrrolidine, piperidine and morpholine.

Replacement of a chlorine or fluorine atom in symmetric dihalogeno-triazine dyestuffs of the formula I by the radical E is a condensation reaction.

This condensation reaction is carried out by methods which are known per se, advantageously in the presence of acid-binding agents, such as sodium acetate, sodium hydroxide or sodium carbonate, under conditions such that a chlorine or fluorine atom which can be replaced still remains in the finished product, that is to say, for example, in the presence of organic solvents or at relatively low to moderately elevated temperatures in an aqueous medium. Possible reactants for this preparation procedure are the following mercapto, hydroxy and amino compounds of the formula XII: aliphatic or aromatic mercapto or hydroxy compounds, such as thioalcohols, thioglycolic acid, thiourea, thiophenols, mercaptobenzothiazoles, methyl alcohol, ethyl alcohol, isopropyl alcohol, glycolic acid, phenol, chloro- or nitro-phenols, phenol-carboxylic and -sulphonic acids, naphthols and naphtholsulphonic acids, and especially ammonia and compounds which contain acylatable amino groups, such as hydroxylamine, hydrazine, phenylhydrazine, phenylhydrazinesulphonic acids, carbamic acid and its derivatives, semi- and thiosemi-carbazides and -carbazones, methyl-, ethyl-, isopropyl-, methoxyethyl- and methoxypropylamine, dimethyl-, diethyl-, methylphenyl- and ethylphenylamine, chloroethylamine, ethanolamines, propanolamine, benzylamine, cyclohexylamine, morpholine, piperidine, piperazine, aminocarbonates, ethyl aminoacetate, aminoethanesulphonic acid and N-methylaminoethanesulphonic acid, and above all aromatic amines, such as aniline, N-methylaniline, toluidines, xylidines, chloroanilines, o-, p- or m-aminoacetanilide, nitroanilines, aminophenols, nitrotoluidines, phenylenediamines, toluylenediamines, anisidine, phenetidine, diphenylamine, naphthylamine, aminonaphthols, diaminonaphthalenes and, in particular, anilines containing acid groups, such as sulphanilic, metanilic and orthanilic acid, anilinedisulphonic acid, aminobenzoic acid, naphthylamine-mono-, -di- and -tri-sulphonic acid, aminobenzoic acids such as 1-hydroxy-5-aminobenzoic acid, and aminonaphthol-mono-, -di- and -trisulphonic acids.

Dyestuffs which contain, as reactive groups, one or two radicals of the formula

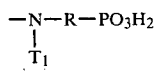

wherein
T₁ and R have the meaning given in the case of formula III,
bonded to a symmetric 2,4,6-triazine can also be prepared by a process in which one or two halogen atoms in the corresponding mono- or di-halogenotriazine dyestuffs are replaced by the radical of the formula

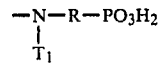

wherein
T₁ and R have the meaning given in the case of formula III,
by reaction with an amine of the formula

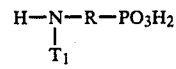

Amines of the formula

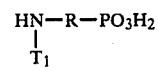

and the reaction conditions are described in German Offenlegungsschrift 2,616,683.

Phthalocyanine compounds (starting compounds) of the formula VIII can be prepared by a process in which a phthalocyanine-sulphonyl chloride of the formula XI

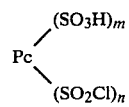     XI wherein
Pc has the meaning given,
m represents a number from 0 to 3,
n represents a number from 1 to 4 and
the sum of m and n is at most 4, is reacted with a triamine of the formula XII

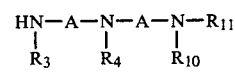     XII wherein
R₃, R₄, R₁₀, R₁₁ and A have the meaning given under formula VI,
preferably in an aqueous medium, and if appropriate in the presence of further amines of the formula

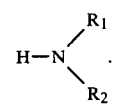

Examples of triamines of the formula XII are:

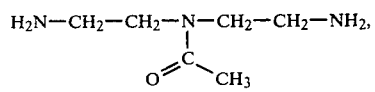

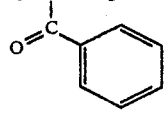
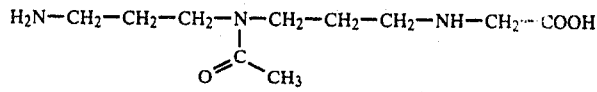

-continued

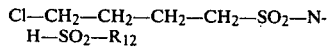

Pure triamines of the formula XII can be reacted with the phthalocyanine-sulphonyl chlorides of the formula XI, but it is equally possible to use the mixtures of triamines obtained when triamines of the formula XII are reacted with alkylating agents of the formula XIII

L—G   XIII wherein
L is a group which can be split off as an anion and
G is an optionally substituted alkyl radical or aralkyl radical, which is preferably substituted by a group which confers solubility in water (such as, for example, COOH or SO$_3$H).

Examples of alkylating agents of the formula XIII are: methyl iodide, ethyl iodide, benzyl bromide, dimethylsulphate and ethylene oxide. Preferred alkylating agents of the formula XIII are, for example: chloroacetic acid, bromoacetic acid, 2-chloropropionic acid, 2-bromopropionic acid, 3-chloropropionic acid, 3-bromopropionic acid, 2-chlorobutyric acid, 2-bromobutyric acid, 3-chlorobutyric acid, 3-bromobutyric acid, 4-chlorobutyric acid, 4-bromobutyric acid, 2-methyl-3-chloropropionic acid, 2-methyl-3-bromopropionic acid, 2-chloroethanesulphonic acid, 2-bromoethanesulphonic acid, 4-chlorobutanesulphonic acid, 4-bromobutanesulphonic acid, o-, m- or p-carboxybenzyl chloride or bromide, o-, m- or p-sulphobenzyl chloride or bromide, hydroxymethanesulphonic acid and halogenoalkyl-disulphimides of the formulae XIV and XV Cl—CH$_2$—CH$_2$—SO$_2$—NH—SO$_2$—R$_{12}$   XIV Cl—CH$_2$—CH$_2$—CH$_2$—CH$_2$—SO$_2$—N-H—SO$_2$—R$_{12}$   XV wherein
R$_{12}$ represents methyl, n-butyl, phenyl, tolyl or p-chlorophenyl.

Compounds of the formula VI in which R$_3$, R$_{10}$ or R$_{11}$ is —CH$_2$—CH$_2$—OSO$_3$H are obtained by alkylation of XII with alkylene oxides, such as ethylene oxide, and subsequent conversion of the product into the sulphuric acid half-ester.

Phthalocyanine compounds of the formula VI can also be prepared by alkylating compounds of the formula VI with compounds of the formula XIII. The alkylation of the compounds of the formula VI or XII can preferably be carried out in an aqueous or aqueous-organic solvent at temperatures between 0° and 140° C., preferably between 20° and 100° C., the acid liberated advantageously being neutralised or buffered by addition of an alkali, such as, for example, sodium bicarbonate, sodium carbonate, sodium hydroxide solution or sodium acetate. Possible organic solvents are, in particular, acetone, chlorohydrocarbons, such as ethylene chloride or chlorobenzene, or aprotic polar solvents, such as dimethylformamide.

If the phthalocyanine-sulphonyl chloride of the formula XI contains fewer sulphonic acid groups than are desired for the compounds of the formulae I or VI, the sulphochloride groups which have not reacted with the triamine are hydrolysed to give sulphonic acid groups.

The invention furthermore relates to a process for the preparation of compounds of the formula VI, characterised in that compounds of the formula XI are reacted with amines of the formula XVI

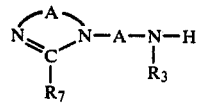   XVI wherein
A, R$_3$ and R$_7$ have the meaning given, if appropriate in the presence of further amines of the formula

wherein
R$_1$ and R$_2$ have the abovementioned meaning, and the intermediate products of the formula XVII

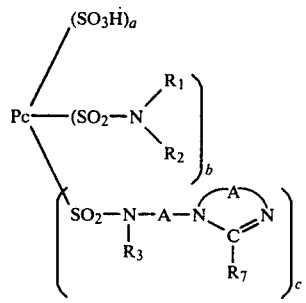   XVII wherein
Pc, R$_1$, R$_2$, R$_3$, A, R$_7$, a, b and c have the meaning given,
are hydrolysed and, if appropriate, reacted with alkylating agents of the formula XIII before, during or after the hydrolysis.

The reaction of compounds of the formula XI with compounds of the formula XVI is preferably carried out in an aqueous, aqueous-organic or organic medium at temperatures between −10° C. and the boiling point of the solvent, but preferably between 0° and 60° C., the acid liberated advantageously being neutralised or buffered by addition of an alkali, such as, for example, sodium bicarbonate, sodium carbonate, sodium hydroxide solution or sodium acetate, or, if appropriate, the acid liberated being bonded by an excess of amine of the formula

Possible organic solvents are, above all, acetone, alcohols, chlorohydrocarbons, such as ethylene chloride or chlorobenzene, and aprotic polar solvents, such as dimethylformamide.

The hydrolysis of the compounds of the formula XVII to give compounds of the formula

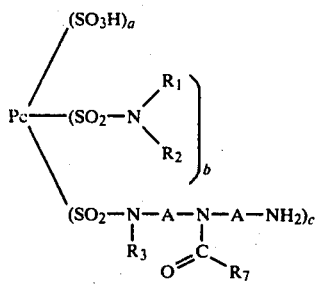

XVIII wherein
Pc, $R_1$, $R_2$, $R_3$, $R_7$, A, a, b and d have the meaning given,
can preferably be carried out in an aqueous-organic or, in particular, aqueous medium at moderately elevated temperatures (about 30°-60° C.), in a neutral pH range or in a moderately alkaline medium. The radical

can be split off by hydrolysis at elevated temperature in an acid or alkaline medium, and the compounds of the formula IXX

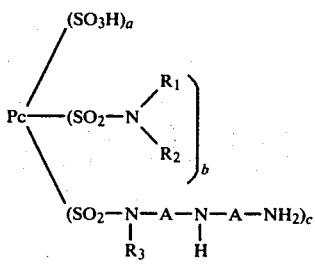

IXX wherein
Pc, $R_1$, $R_2$, $R_3$, A, a, b and c have the meaning given, are obtained.

The compounds of the formulae XVI, XVII, XVIII, IXX and XII can be converted into other compounds which are particularly suitable for the process according to the invention, by reaction with alkylating agents of the formula XIII.

It is particularly advantageous to use compounds of the formula XVI for the preparation of compounds of the formula VI, since these starting materials can be employed in molar amounts, whilst a large excess of amines of the formula XI must be employed if these are used as starting materials, in order to suppress the formation of undesired poly-condensed products, which are difficult to wash out of reactive dyestuffs. An excess of amine is undesirable, since the recovery of these amines from the effluent is technically complicated and causes ecological problems.

Amines of the formula XVI can be prepared, for example, by methods which are known from the literature, by reacting nitriles of the formula $R_7$—C≡N with triamines of the formula

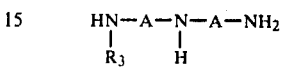

if appropriate in the presence of catalytic amounts of sulphur or inorganic organic sulphur compounds, at elevated temperatures, or by subjecting compounds of the formula $R_7$—COOH to a condensation reaction with triamines of the formula

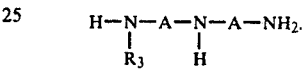

Phthalocyanine-sulphonic acid chlorides of the formula XI can be obtained by treating the corresponding phthalocyanine or phthalocyanine-sulphonic acid with chlorosulphonic acid, if necessary in the presence of carbon tetrachloride or an acid halide, such as thionyl chloride, sulphuryl chloride, phosphorus pentachloride, phosphorus oxychloride or phosphorus trichloride, as described in British Pat. Specification Nos. 708,543, 784,834 and 785,629 and in U.S. Pat. No. 2,219,330. The dyestuffs according to the invention can be uniform substances, that is to say the letters a, b, c and d represent integers. However, mixtures which are not characterised by integers for a, b, c and d are preferentially obtained in the preparation of these dyestuffs. These numbers are mean values. Such mixtures sometimes have particular advantages in respect of solubility and substantivity. The numbers in such mixtures vary in their averaged value.

Such mixtures according to the invention are prepared, for example, from two or more in each case uniform end dyestuffs of the formula I, or particularly advantageously by using a mixture of starting components. The latter is frequently unavoidably formed, since phthalocyanine-(sulphonic acid chloride)-sulphonic acids differ in respect of their degree of sulphonation and their ratio of sulphonic acid chloride groups to sulphonic acid groups.

The new dyestuffs of the formula I are suitable for dyeing and printing materials containing hydroxyl groups or amide groups, such as textile fibres, filaments and fabrics of wool, silk or synthetic polyamide or polyurethane fibres, and for dyeing and printing natural or regenerated cellulose to give dyeings and prints which are fast to washing, it being advantageous to treat cellulose materials in the presence of acid-binding agents and, if appropriate, by the action of heat, by the processes which have been disclosed for reactive dyestuffs.

The formulae given for the dyestuffs are those of the corresponding free acids. The dyestuffs are generally isolated, and employed for dyeing, in the form of the alkali metal salts, in particular the sodium salts.

The amounts by weight given in the examples relate to the free acid, and the figures given for the indices represent mean values.

EXAMPLE 1a 95 g of copper phthalocyanine-(sulphonic acid)trisulphonyl chloride are introduced into an ice-cold solution of 5,35 g of $NH_4Cl$ in 500 ml of ice-water. 25.4 g of 1-($\beta$-aminoethyl)-2-methyl-2-imidazoline are added dropwise and the pH is adjusted to 9.5 with 6 N NaOH. The mixture is warmed slowly to 45° C. and the pH value is maintained with sodium hydroxide solution. When no further sodium hydroxide solution is consumed, 18.9 g of chloroacetic acid are added, the pH is adjusted to 11 with sodium hydroxide solution and the mixture is warmed to 70° C. It is subsequently stirred at 70°–80° C. and at pH 11 for 3 hours. After the mixture has been cooled, it is adjusted to pH 6–7 with half concentrated HCl. The dyestuff of the probable formula

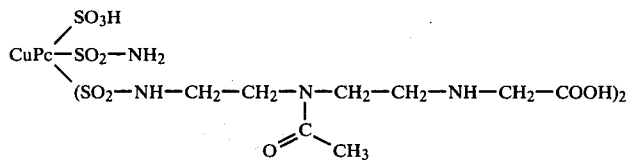

is isolated.

EXAMPLE 1b 126.4 g of the dyestuff prepared according to Example 1a are acylated with 49 g of 2,4-dichloro-6-methoxyethoxy-1,3,5-triazine in 900 ml of ice-water at pH 6–7, in the presence of a surface-active agent. The pH is maintained at 6–7 with 13% strength sodium carbonate solution, and the mixture is warmed slowly to 35° C., during which the pH value is maintained. When no further sodium carbonate solution is consumed, the dyestuff of the formula

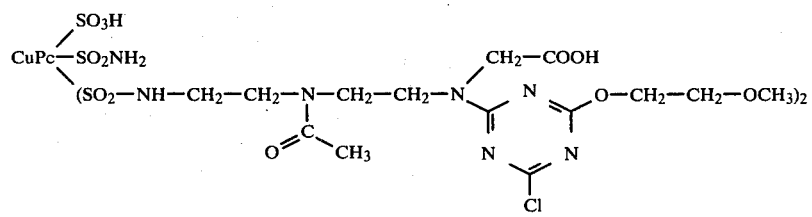

is salted out by addition of sodium chloride and is isolated. The dyestuff dyes cellulose fibres in a brilliant turquoise with outstanding fastness properties by one of the use examples given.

EXAMPLE 2

If the procedure followed is as described in Example 1, but the chloroacetic acid is replaced by an equivalent amount of one of the alkylating agents which follow, valuable reactive dyestuffs are likewise obtained: methyl iodide, ethyl iodide, benzyl bromide, dimethyl sulphate, ethylene oxide, bromoacetic acid, 2-chloropropionic acid, 2-bromopropionic acid, 3-chloropropionic acid, 3-bromopropionic acid, 2-chlorobutyric acid, 2-bromobutyric acid, 3-chlorobutyric acid, 3-bromobutyric acid, 4-chlorobutyric acid, 4-bromobutyric acid, 2-methyl-3-chloropropionic acid, 2-methyl-3-bromopropionic acid, 2-chloroethanesulphonic acid, 2-bromoethanesulphonic acid, 4-chlorobutanesulphonic acid, 4-bromobutanesulphonic acid, o-, m- or p-carboxybenzyl chloride or bromide, o-, m- or p-sulphobenzyl chloride or bromide, hydroxymethanesulphonic acid or $Cl-CH_2-CH_2-SO_2-NH-SO_2-CH$.

EXAMPLE 3

If the procedure followed is as described in Examples 1 and 2, but the 2,4-dichloro-6-methoxyethoxy-1,3,5-triazine is replaced by an equivalent amount of one of the acylating agents which follow, valuable reactive dyestuffs are likewise obtained: 2,6-dichloro-4-aminotriazine, 2,6-dichloro-4-(o-, m- or p-sulphophenyl)-aminotriazine, 2,6-difluoro-4-aminotriazine, 2,6-difluoro-4-(o-, m- or p-sulphophenyl)-aminotriazine, 2,4,6-trifluoro-5-chloropyrimidine, 2,4,6-trifluoro-5-methylpyrimidine, 2,3-dichloroquinoxaline-6-carboxylic acid chloride or -6-sulphonic acid chloride, 2-chloroacetyl chloride or 2-chloroethanesulphonyl chloride.

EXAMPLE 4

If the procedure followed is as described in Examples 1–3, but the ammonium chloride is replaced by an equivalent amount of one of the amines, or a salt thereof, listed below, reactive dyes with good fastness properties are obtained: methylamine, morpholine, N-methylpiperazine, aminoacetic acid, taurine, N-methyltaurine, methoxyethylamine, o-, m- or p-aminobenzenesulphonic acid, o-, m- or p-aminobenzoic acid, ethylamine, isopropylamine or $\alpha$- or $\beta$-aminopropionic acid.

EXAMPLE 5

93.2 g of copper phthalocyanine-(disulphonic acid)-disulphonyl chloride are introduced into 1.5 l of ice-water. 31 g of 1-($\gamma$-aminopropyl)-2-methyl-1,4,5,6-tetrahydro-pyrimidine are added dropwise and the pH is adjusted to 9.3 with sodium hydroxide solution. The mixture is warmed to 45° C. and the pH value is maintained with sodium hydroxide solution. When no further sodium hydroxide solution is consumed, the pH is adjusted to 11 and the mixture is warmed to 70° C. at this pH value for 3 hours. The mixture is cooled to 0° C., during which it is adjusted to pH 6.5 with half-concentrated HCl. A solution of 40 g of cyanuric chloride in a little acetone is added, and the pH value is maintained with 10% strength sodium carbonate solution. When the acylation has ended, the pH is adjusted to 9 with half-concentrated ammonia solution and the mixture is warmed to 40° C. The pH value is maintained by adding further NH₃ solution. When the reaction has ended, the pH is adjusted to 6.8 with 10% strength HCl. The reactive dyestuff of the formula

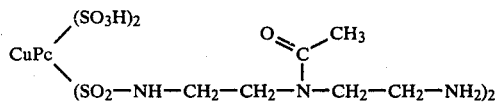

is isolated. 114.9 g of this dyestuff are introduced into 1

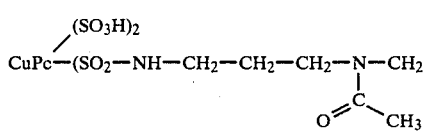

is precipitated by addition of NaCl and is isolated. The dyestuff dyes cellulose fibres in a clear turquoise with very good fastness properties by one of the use examples given.

EXAMPLE 6

95 g of copper phthalocyanine-(disulphonic acid)-disulphonyl chloride are introduced into 900 ml of ice-water. 87 g of N,N-(β-aminoethyl)-acetamide are added, the pH is adjusted to 9.5 and the mixture is warmed to 45° C., the pH value being maintained with sodium hydroxide solution. When no further sodium hydroxide solution is consumed, the mixture is rendered neutral and the dyestuff is salted out. It is filtered off and washed with 1% strength HCl until free from unreacted amine. The dyestuff of the formula l of ice-water. 36 g of 2,6-dichloro-4-methoxytriazine are added, in the presence of a surface-active agent, and acylation is carried out at pH 6.5-7. The pH value is maintained with sodium carbonate solution. The mixture is warmed to 35° C., the pH value being maintained, and the dyestuff is salted out when acylation is complete. The reactive dyestuff of the formula

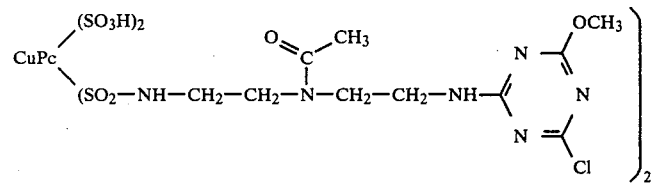

is isolated. The dyestuff dyes cellulose fibres in a fast turquoise by one of the use examples given.

EXAMPLE 7

If the procedure followed is as described in Example 6, but the N,N-bis-(β-aminoethyl)-acetamide is replaced by an equivalent amount of one of the amines which follow, valuable reactive dyestuffs are likewise obtained:

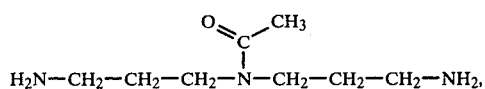

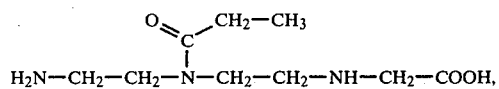

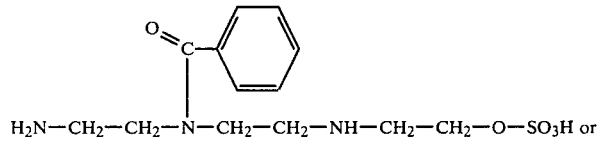

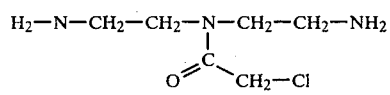

EXAMPLE 8

If the procedure followed is as described in Examples 1-4, but the 1-(β-aminoethyl)-2-methyl-imidazoline is replaced by an equivalent amount of one of the nitrogen-containing heterocyclic compounds which follow, valuable reactive dyestuffs are likewise obtained:

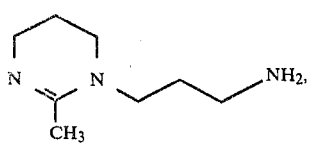

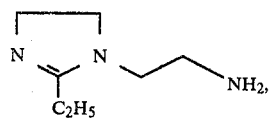

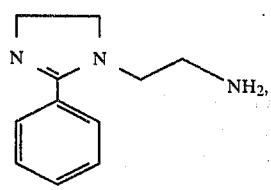

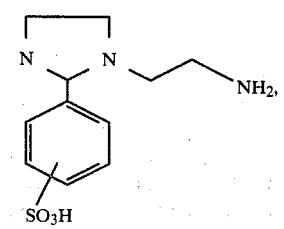

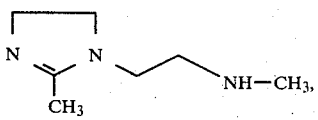

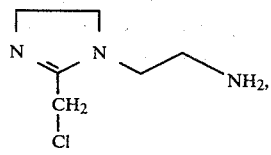

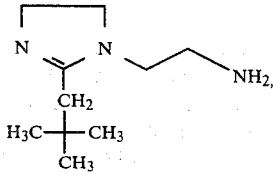

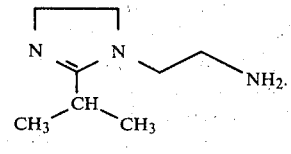

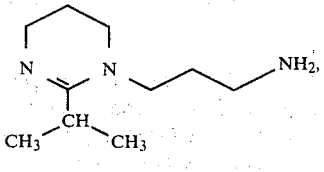

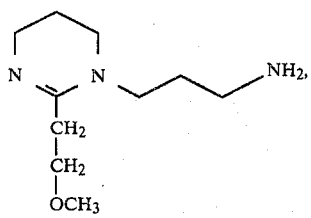

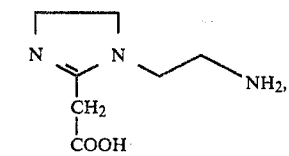

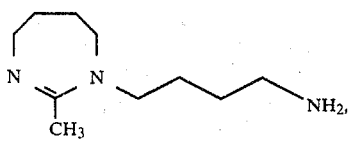

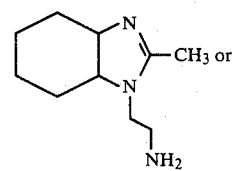

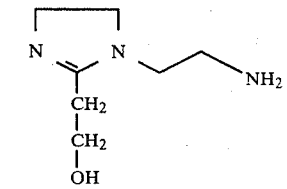

EXAMPLE 9

If the procedure followed is as described in Examples 1–8, but the acylating agents given in those Examples are replaced by an equivalent amount of one of the acylating agents which follow, valuable reactive dyestuffs which dye cellulose fibres in a clear turquoise by one of the use examples given are likewise obtained: 2,6-dichloro-4-methoxytriazine, 2,6-dichloro-4-methylaminotriazine, 2,6-dichloro-4-o-, m- or p-carboxyphenylaminotriazine, 2,6-dichloro-4-methoxyethylaminotriazine, 2,6-dichloro-4-β-sulphoethylaminotriazine, 2,6-dichloro-4-carboxymethylaminotriazine, 2,6-dichloro-4-β-sulphoethylaminotriazine, 2,6-difluoro-4-phenylaminotriazine, 2,6-difluoro-4-(4′,8′-disulphonaphth-2′-yl)-aminotriazine, 2,6-difluoro-4-(2′-sulpho-4′-methoxyphenyl)-aminotriazine, tetrachloropyrimidine, α- or β-bromoacrylyl chloride or 2,4-difluoro-5-chloro-6-methylpyrimidine.

EXAMPLE 10

If the copper phthalocyanine compounds in Examples 1 to 11 are replaced by equivalent amounts of the corresponding nickel phthalocyanine compounds, valuable reactive dyestuffs which give, on cellulose-containing material, deep, brilliant green shades with good general fastness properties by one of the use examples mentioned are likewise obtained.

Use example

Printing instructions 30 g of the dyestuff of Example 1 are dissolved in 339 ml of water and 200 g of urea, the solution is poured into 400 g of an approximately 5% strength sodium alginate thickener, and 30 g of potassium carbonate and 1 g of sodium hydroxide of 36° Be strength are added. In the customary manner, the resulting printing paste is used to print a cotton fabric and the fabric is dried. The fabric is then steamed at 100° to 101° for 8 minutes, rinsed, soaped, rinsed again and dried. A clear turquoise print with good fastness to wet processing and light results.

Padding instructions 30 parts of the dyestuff prepared in Example 1 are dissolved in 1,000 parts of water. Cotton fabric is padded with this solution and pressed off to a weight increase of 90%. The still moist cotton is treated, at 70° for 30 minutes, in a bath containing 200 parts of calcined sodium sulphate and 10 parts of calcined sodium carbonate dissolved in 100 parts of water. The dyeing is then finished in the customary manner. A brilliant turquoise dyeing with outstanding fastness to wet processing and light is obtained.

Dyeing instructions 168 ml of water of 20°-25° C. are introduced into a dye beaker which has a capacity of 300 ml and is in a water bath which can be heated. 0.3 g of the dyestuff obtained according to Example 6 are mixed thoroughly with 2 ml of cold water to form a paste, and 30 ml of hot water (70° C.) are added; the dyestuff thereby dissolves. The dyestuff solution is added to the water in the beaker, and 10 g of cotton yarn are kept continuously in motion in this dye liquor. The temperature of the dye liquor is increased to 40°-50° C. in the course of 10 minutes, 10 g of anhydrous sodium sulphate are added and dyeing is continued for 30 minutes. 4 g of anhydrous sodium carbonate are then added to the dye liquor and dyeing is continued at 40°-50° C. for 60 minutes. The dyed material is then taken out of the dye liquor, the adhering liquor is removed by wringing out or pressing off, and the material is rinsed first with cold water and then with hot water, until the rinsing liquor is no longer stained. The dyed material is then rinsed again, in 200 ml of a liquor containing 0.2 g of sodium alkyl-sulphate, and is dried at 60°-70° in a drying cabinet. A brilliant turquoise dyeing with outstanding fastness to washing and light is obtained.

We claim:

1. Reactive dyestuffs which, in the form of the free acids, correspond to the formula I

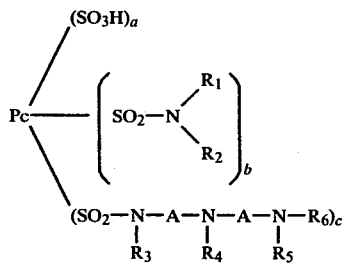

wherein

Pc is the radical of a phthalocyanine, $R_1$ and $R_2$ are identical or different and represent hydrogen, unsubstituted alkyl, alkyl substituted by OH, COOH or $SO_3H$, unsubstituted cycloalkyl, cycloalkyl substituted by OH, COOH or $SO_3H$, unsubstituted aralkyl, aralkyl substituted by OH, COOH or $SO_3H$ in the aryl part, unsubstituted aryl, aryl substituted by OH, COOH, $SO_3H$ or halogen, or wherein $R_1$ and $R_2$, together with the nitrogen atom between them form a heterocyclic radical selected from

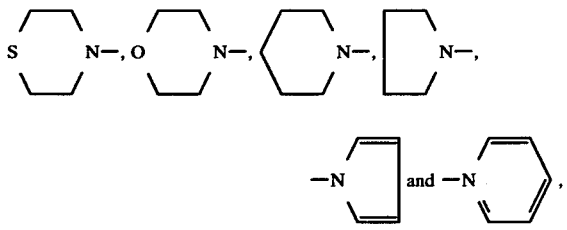

and wherein a is a number from 0 to 3, b is a number from 0 to 3 and c is a number from 1 to 4, wherein $(a+b+c) \leq 4$, and wherein the radicals A are identical or different and represent unsubstituted straight-chain alkylene with at least 2 carbon atoms, straight-chain $C_2$–$C_{10}$-alkylene substituted by OH, $SO_3H$ or COOH; unsubstituted branched $C_3$–$C_{10}$-alkylene, branched $C_3$–$C_{10}$-alkylene substituted by OH, $SO_3H$ or COOH; unsubstituted $C_5$–$C_7$-cycloalkylene, $C_5$–$C_7$-cycloalkylene substituted by OH, $SO_3H$ or COOH $R_3$ is hydrogen, unsubstituted $C_1$–$C_8$-alkyl, $C_1$–$C_8$-alkyl substituted by COOH, $SO_3H$ or OH; unsubstituted phenyl-$C_1$–$C_4$ alkyl or naphthyl $C_1$–$C_4$-alkyl, phenyl-$C_1$–$C_4$-alkyl or naphthyl-$C_1$–$C_4$-alkyl substituted by OH, $SO_3H$ or COOH $R_4$ is a radical of the formula

wherein $R_7$ is unsubstituted $C_1$–$C_{12}$-alkyl, $C_1$–$C_{12}$-alkyl substituted by OH, $SO_3H$, COOH, halogen, $C_1$–$C_4$-alkoxy or phenoxy; unsubstituted $C_3$–$C_7$-cycloalkyl; $C_3$–$C_7$-cycloalkyl substituted by OH, COOH or $SO_3H$; unsubstituted benzyl, naphthylmethyl or phenethyl; benzyl, naphthylmethyl or phenethyl substituted by OH, $SO_3H$, COOH, halogen, $NO_2$, $C_1$–$C_4$-alkyl or $C_1$–$C_4$-alkoxy; unsubstituted phenyl or naphthyl; phenyl or naphthyl substituted by OH, $SO_3H$, COOH, $C_1$–$C_4$-alkoxy, halogen, $NO_2$, $C_1$–$C_4$-acyl or $C_1$–$C_4$-alkyl; unsubstituted heteroaryl, hetero-aryl substituted by OH, $SO_3H$, COOH, halogen or $C_1$–$C_4$-alkyl; and wherein $R_5$ is Z wherein Z is the radical of a halogenotriazine, a halogenopyrimidine, the radical of 2,3-dichloroquinoxaline-6-carboxylic acid chloride, 2,3-dichloroquinoxaline-6-sulphonic acid chloride, 2-chloroacetyl chloride or 2-chloroethanesulphonyl chloride,
and wherein
$R_6$ is hydrogen, unsubstituted $C_1$-$C_8$-alkyl, $C_1$-$C_8$-alkyl substituted by COOH, $SO_3H$ or OH; unsubstituted phenyl-$C_1$-$C_4$-alkyl, or naphthyl-$C_1$-$C_4$-alkyl, phenyl-$C_1$-$C_4$-alkyl or naphthyl-$C_1$-$C_4$-alkyl substituted by OH, $SO_3H$ or COOH.

2. Reactive dyestuffs which, in the form of the free acid, correspond to the formula IV

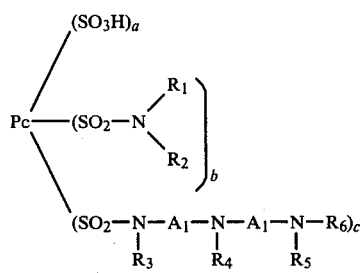

wherein
$R_1$, $R_2$, $R_3$, $R_4$, $R_5$, $R_6$, Pc, a, b and c have the meaning given in claim 1 and the radicals $A_1$ are identical or different and represent —$CH_2$—$CH_2$—,

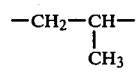

or —$CH_2$—$CH_2$—$CH_2$—.

3. Reactive dyestuffs which, in the form of the free acid, correspond to the formula IVa

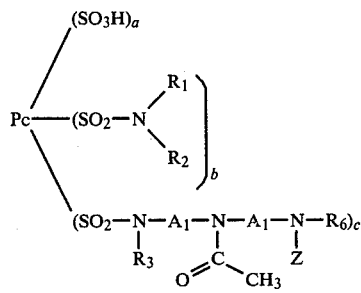

wherein
Pc, $R_1$, $R_2$, $R_3$, $A_1$, Z, $R_6$, a, b and c have the meaning given in claim 2.

4. Reactive dyestuffs which, in the form of the free acid, correspond to the formula V

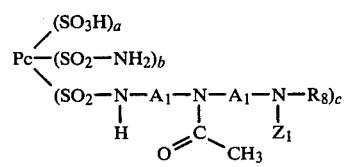

wherein
Pc, $A_1$, a, b and c have the meaning given in claim 2,
$R_8$ represents hydrogen, carboxymethyl or carboxyethyl and
$Z_1$ denotes the radical of a mono- or di-halogenotriazine.

* * * * *